US012699435B2

(12) United States Patent
Patel et al.

(10) Patent No.: US 12,699,435 B2
(45) Date of Patent: Aug. 4, 2026

(54) CONTROLLING INSTRUCTION ISSUE RATE USING CREDIT-BASED MECHANISMS IN PROCESSOR DEVICES

(71) Applicant: QUALCOMM Incorporated, San Diego, CA (US)

(72) Inventors: Vinay Patel, Stouffville (CA); Nitin Makhija, San Jose, CA (US); Pradeep Kanapathipillai, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 18/759,473

(22) Filed: Jun. 28, 2024

(65) Prior Publication Data

US 2026/0056597 A1      Feb. 26, 2026

(51) Int. Cl.
  *G06F 1/3234*          (2019.01)
(52) U.S. Cl.
  CPC .................................. *G06F 1/3243* (2013.01)
(58) Field of Classification Search
  CPC .......................................... G06F 1/3243
  USPC .......................................................... 713/320
  See application file for complete search history.

(56) References Cited

U.S. PATENT DOCUMENTS

| | | | | | |
|---|---|---|---|---|---|
| 3,593,306 | A * | 7/1971 | Toy | .......................... | G06F 9/325 |
| | | | | | 712/E9.058 |
| 4,369,443 | A * | 1/1983 | Giallanza | ............ | H04W 88/023 |
| | | | | | 340/7.41 |
| 4,740,969 | A * | 4/1988 | Fremont | ............. | G06F 11/1407 |
| | | | | | 714/15 |
| 5,471,593 | A * | 11/1995 | Branigin | ............. | G06F 9/30018 |
| | | | | | 712/E9.05 |
| 5,488,716 | A * | 1/1996 | Schneider | ........... | G06F 11/2038 |
| | | | | | 714/13 |
| 5,553,256 | A * | 9/1996 | Fetterman | ............... | G06F 9/384 |
| | | | | | 711/204 |
| 5,694,574 | A * | 12/1997 | Abramson | ............ | G06F 9/3854 |
| | | | | | 711/E12.051 |
| 5,724,536 | A * | 3/1998 | Abramson | ............ | G06F 9/3816 |
| | | | | | 712/216 |
| 6,223,258 | B1 * | 4/2001 | Palanca | ................. | G06F 9/3854 |
| | | | | | 712/E9.046 |

(Continued)

OTHER PUBLICATIONS

International Search Report and Written Opinion for International Patent Application No. PCT/US2025/028894, mailed Sep. 22, 2025, 13 pages.

*Primary Examiner* — Paul R. Myers
(74) *Attorney, Agent, or Firm* — W&T

(57)          ABSTRACT

Controlling instruction issue rate using credit-based mechanisms in processor devices is disclosed herein. In some aspects, a processor device comprises a credit logic circuit that is communicatively coupled to a reservation station (RS) circuit, and that comprises a credit counter. The credit logic circuit receives an instruction issue indication for an instruction from the RS circuit during a time interval. The credit logic circuit decrements a value of a credit counter. The credit logic circuit also determines whether the value of the credit counter equals or is less than a blocking threshold, and, if so, asserts a block signal to the RS circuit. The RS circuit is configured to receive the block signal, and, responsive to receiving the block signal, block further instruction issuance during the time interval.

20 Claims, 6 Drawing Sheets

(56)          References Cited

U.S. PATENT DOCUMENTS

| | | | |
|---|---|---|---|
| 6,247,125 B1 * | 6/2001 | Noel-Baron | G06F 9/325 |
| | | | 711/138 |
| 6,672,963 B1 * | 1/2004 | Link | A63F 13/92 |
| | | | 463/43 |
| 12,487,936 B1 * | 12/2025 | Favor | G06F 12/0864 |
| 2005/0289299 A1 * | 12/2005 | Nunamaker | G06F 9/3888 |
| | | | 712/E9.023 |
| 2006/0026447 A1 * | 2/2006 | Naveh | G06F 1/3203 |
| | | | 713/322 |
| 2008/0244533 A1 * | 10/2008 | Berg | G06F 12/126 |
| | | | 717/128 |
| 2012/0254643 A1 * | 10/2012 | Fetzer | G06F 1/324 |
| | | | 713/320 |
| 2013/0262831 A1 * | 10/2013 | Nelson | G06F 1/329 |
| | | | 712/215 |
| 2014/0189066 A1 * | 7/2014 | Gholmieh | H04N 21/262 |
| | | | 709/219 |
| 2015/0033045 A1 | 1/2015 | Raghuvanshi et al. | |
| 2015/0089198 A1 * | 3/2015 | Sommers | G06F 9/3836 |
| | | | 712/214 |
| 2016/0274915 A1 | 9/2016 | Chatha et al. | |
| 2019/0207962 A1 * | 7/2019 | Wang | G06F 21/552 |
| 2019/0294472 A1 * | 9/2019 | Varadarajan | G06F 9/4881 |
| 2021/0025956 A1 * | 1/2021 | Niederlöhner | G01R 33/0023 |
| 2022/0067155 A1 * | 3/2022 | Favor | G06F 9/3854 |
| 2025/0004776 A1 * | 1/2025 | Huang | G06F 9/3836 |

* cited by examiner

CONTROLLING INSTRUCTION ISSUE RATE USING CREDIT-BASED MECHANISMS IN PROCESSOR DEVICES

TECHNICAL FIELD

The technology of the disclosure relates generally to power management in processor devices, and, in particular, to managing power consumption by throttling a processor device's instruction issue rate.

BACKGROUND

Modern processor devices such as processor cores, processor core clusters, and System-on-Chips (SoCs) may implement a variety of power management techniques to ensure that power consumption and thermal levels remain within designated limits. These limits may specify, e.g., total current draw levels and/or thermal levels within a processor device that are allowable during a defined time interval, and may vary from one time interval to the next.

One conventional technique for power management in processor devices involves limiting the rate at which a processor device is allowed to issue instructions for execution during a specified time interval. For example, a throttle rate of 25% may be specified for a given time interval, which would permit the processor device to issue instructions during 25% of the processor cycles within that time interval. Consequently, if the time interval includes 16 processor cycles, the processor device could issue a maximum of four (4) instructions during the time interval.

However, such conventional techniques risk introducing deadlock situations and/or causing excessive delay. For instance, one common mechanism for throttling instruction issuance uses a randomly generated blocking vector comprising bit values that indicate processor cycles within the time interval during which instructions may be issued. This can lead to a scenario in which a processor device attempts to issue an instruction every Nth cycle, but the blocking vector indicates that those cycles are blocked over a large window of time. The result is a much lower instruction issue rate for the processor device than intended, which negatively impacts overall processor performance.

Accordingly, a mechanism for more effectively controlling instruction issue rate for power management is desirable.

SUMMARY OF THE DISCLOSURE

Aspects disclosed in the detailed description include controlling instruction issue rate using credit-based mechanisms in processor devices. Related apparatus, methods, and computer-readable media are also disclosed. In this regard, a processor device comprises a credit logic circuit that is communicatively coupled to a reservation station (RS) circuit of a scheduling stage circuit of the processor device. The credit logic circuit is configured to provide a credit-based mechanism to determine a number of times instructions can be issued by the RS circuit within a given time window. In exemplary operation, the credit logic circuit receives an instruction issue indication for an instruction from the RS circuit during a time interval (i.e., upon issuance of an instruction by the RS circuit). The credit logic circuit decrements a value of a credit counter, and determines whether the value of the credit counter equals or is less than a blocking threshold. According to some aspects, the blocking threshold may comprise a value of zero (0), while some aspects in which a communications latency exists between the credit logic circuit and the RS circuit may provide that the blocking threshold comprises a count of processor cycles of the communications latency. If the credit logic circuit determines that the value of the credit counter equals or is less than the blocking threshold, the credit logic circuit asserts a block signal to the RS circuit, which causes the RS circuit to block further instruction issuance during the time interval.

In some aspects, the RS circuit, upon determining that an instruction is ready for issue, determines whether the block signal is asserted. If the block signal is not asserted, the RS circuit issues the instruction, and also transmits the instruction issue indication to the credit logic circuit.

Some aspects may provide that the credit logic circuit initially deasserts the block signal to the RS circuit. The credit logic circuit receives a throttle rate from a power management circuit, and sets the value of the credit counter to a replenishment amount that corresponds to the throttle rate. In some aspects, the throttle rate indicates a percentage of processor cycles of a time interval during which instructions may issue, and the replenishment amount is calculated as a product of the percentage and a count of the processor cycles of the time interval.

In some aspects, at a start of a next time interval, the credit logic circuit deasserts the block signal to the RS circuit, and resets the credit counter to the replenishment amount. Some aspects may provide that, at the start of the next time interval, the credit logic circuit deasserts the block signal to the RS circuit, and adds the replenishment amount to the value of the credit counter, thereby allowing unused credit to accumulate over multiple time intervals. In some such aspects, the credit logic circuit may determine whether the value of the credit counter exceeds a maximum threshold. If so, the credit logic circuit sets the value of the credit counter to the maximum threshold.

In another aspect, a processor device is provided. The processor device comprises an instruction processing circuit that comprises a plurality of pipeline stage circuits, including a scheduling stage circuit comprising an RS circuit. The processor device further comprises a credit logic circuit that is communicatively coupled to the RS circuit, and that comprises a credit counter. The credit logic circuit is configured to receive an instruction issue indication for an instruction from the RS circuit during a time interval. The credit logic circuit is further configured to decrement a value of the credit counter. The credit logic circuit is also configured to determine whether the value of the credit counter equals or is less than a blocking threshold. The credit logic circuit is additionally configured to, responsive to determining that the value of the credit counter equals or is less than the blocking threshold, assert a block signal to the RS circuit. The RS circuit is configured to receive the block signal, and, responsive to receiving the block signal, block further instruction issuance during the time interval.

In another aspect, a processor device is provided. The processor device comprises means for receiving an instruction issue indication for an instruction from an RS circuit during a time interval. The processor device further comprises means for decrementing a value of a credit counter. The processor device also comprises means for determining whether the value of the credit counter equals or is less than a blocking threshold. The processor device additionally comprises means for asserting a block signal to the RS circuit, responsive to determining that the value of the credit counter equals or is less than the blocking threshold. The processor device further comprises means for receiving the block signal. The processor device also comprises means for blocking further instruction issuance during the time interval, responsive to receiving the block signal.

In another aspect, a method for controlling instruction issue rate using credit-based mechanisms in processor devices is provided. The method comprises receiving, by a credit logic circuit of a processor device, an instruction issue indication for an instruction from an RS circuit of the processor device during a time interval. The method further comprises decrementing, by the credit logic circuit, a value of a credit counter. The method also comprises determining, by the credit logic circuit, that the value of the credit counter equals or is less than a blocking threshold. The method additionally comprises, responsive to determining that the value of the credit counter equals or is less than the blocking threshold, asserting, by the credit logic circuit, a block signal to the RS circuit. The method further comprises receiving, by the RS circuit, the block signal. The method also comprises, responsive to receiving the block signal, blocking, by the RS circuit, further instruction issuance during the time interval.

In another aspect, a non-transitory computer-readable medium is disclosed. The non-transitory computer-readable medium stores computer-executable instructions that, when executed, cause a processor device to receive an instruction issue indication for an instruction from an RS circuit during a time interval. The computer-executable instructions further cause the processor device to decrement a value of a credit counter. The computer-executable instructions also cause the processor device to determine whether the value of the credit counter equals or is less than a blocking threshold. The computer-executable instructions additionally cause the processor device to, responsive to determining that the value of the credit counter equals or is less than the blocking threshold, assert a block signal to the RS circuit. The computer-executable instructions further cause the processor device to receive the block signal, and, responsive to receiving the block signal, block further instruction issuance during the time interval.

DETAILED DESCRIPTION

Figure 1:
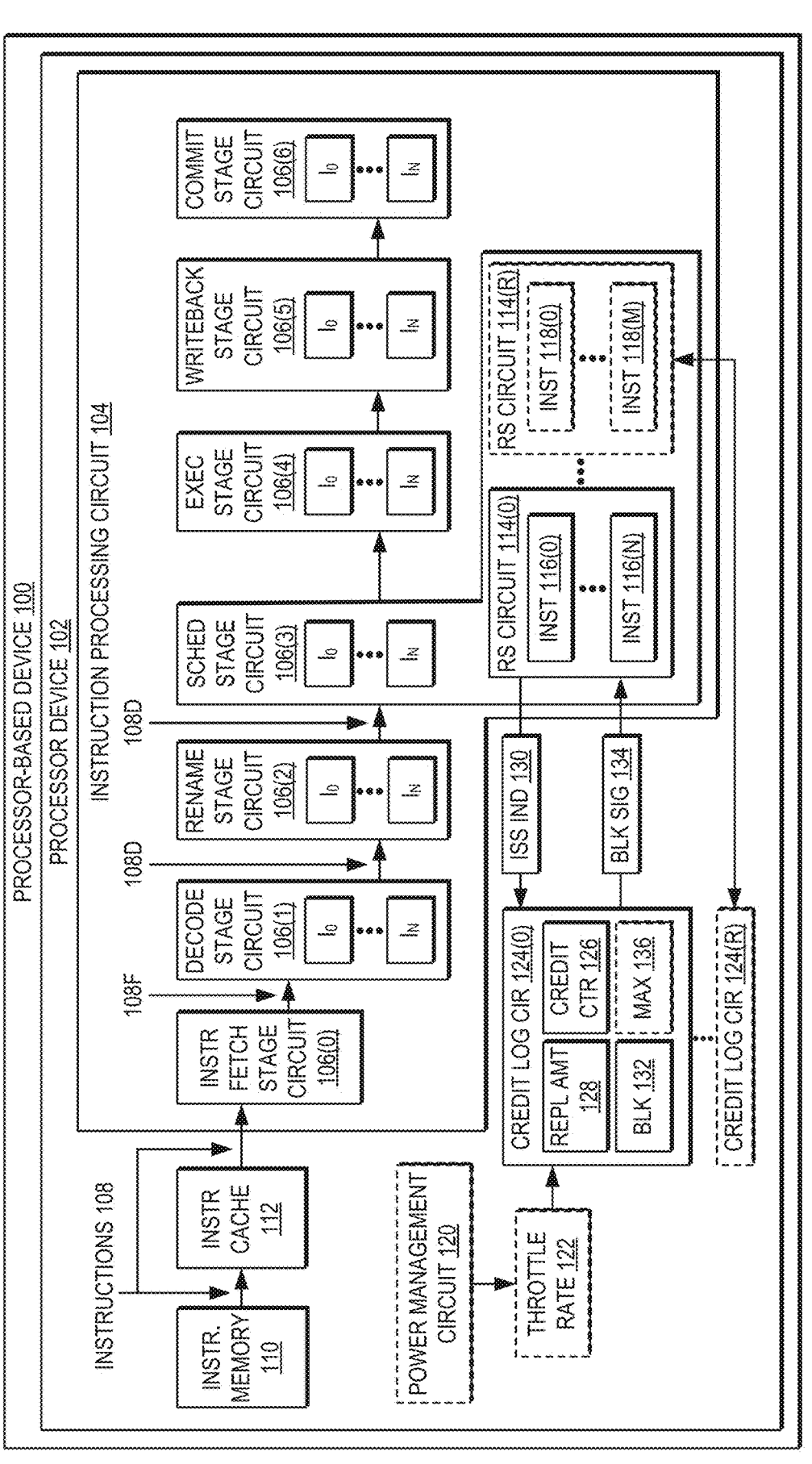
FIG. 1 is a block diagram illustrating an exemplary processor device that includes a credit logic circuit configured to control instruction issue rate using credit-based mechanisms, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include controlling instruction issue rate using credit-based mechanisms in processor devices. Related apparatus, methods, and computer-readable media are also disclosed. In this regard, a processor device comprises a credit logic circuit that is communicatively coupled to a reservation station (RS) circuit of a scheduling stage circuit of the processor device. The credit logic circuit is configured to provide a credit-based mechanism to determine a number of times instructions can be issued by the RS circuit within a given time window. In exemplary operation, the credit logic circuit receives an instruction issue indication for an instruction from the RS circuit during a time interval (i.e., upon issuance of an instruction by the RS circuit). The credit logic circuit decrements a value of a credit counter, and determines whether the value of the credit counter equals or is less than a blocking threshold. According to some aspects, the blocking threshold may comprise a value of zero (0), while some aspects in which a communications latency exists between the credit logic circuit and the RS circuit may provide that the blocking threshold comprises a count of processor cycles of the communications latency. If the credit logic circuit determines that the value of the credit counter equals or is less than the blocking threshold, the credit logic circuit asserts a block signal to the RS circuit, which causes the RS circuit to block further instruction issuance during the time interval.

In some aspects, the RS circuit, upon determining that an instruction is ready for issue, determines whether the block signal is asserted. If the block signal is not asserted, the RS circuit issues the instruction, and also transmits the instruction issue indication to the credit logic circuit.

Some aspects may provide that the credit logic circuit initially deasserts the block signal to the RS circuit. The credit logic circuit receives a throttle rate from a power management circuit, and sets the value of the credit counter to a replenishment amount that corresponds to the throttle rate. In some aspects, the throttle rate indicates a percentage of processor cycles of a time interval during which instructions may issue, and the replenishment amount is calculated as a product of the percentage and a count of the processor cycles of the time interval.

In some aspects, at a start of a next time interval, the credit logic circuit deasserts the block signal to the RS circuit, and resets the credit counter to the replenishment amount. Some aspects may provide that, at the start of the next time interval, the credit logic circuit deasserts the block signal to the RS circuit, and adds the replenishment amount to the value of the credit counter, thereby allowing unused credit to accumulate over multiple time intervals. In some such aspects, the credit logic circuit may determine whether the value of the credit counter exceeds a maximum threshold. If so, the credit logic circuit sets the value of the credit counter to the maximum threshold.

In this regard, FIG. 1 is a diagram of an exemplary processor-based device 100 that includes a processor device 102. The processor device 102, which also may be referred to as a "processor core" or a "central processing unit (CPU) core," is an out-of-order processor, and may be one of a plurality of processor devices 102 provided by the processor-based device 100. In the example of FIG. 1, the processor device 102 includes an instruction processing circuit 104 that comprises multiple stage circuits including an instruction fetch stage circuit (captioned as "INSTR FETCH STAGE CIRCUIT" in FIG. 1) 106(0), a decode stage circuit 106(1), a rename stage circuit 106(2), a scheduling stage circuit (captioned as "SCHED STAGE CIRCUIT" in FIG. 1) 106(3), an execution stage circuit (captioned as "EXEC STAGE CIRCUIT" in FIG. 1) 106(4), a writeback stage circuit 106(5), and a commit stage circuit 106(6), which may be collectively referred to herein as a "plurality of pipeline stage circuits 106" or "pipeline stage circuits 106." The instruction processing circuit 104 also includes one or more instruction pipelines $I_0$-$I_N$ for processing instructions 108 fetched from an instruction memory (captioned as "INSTR MEMORY" in FIG. 1) 110 by the instruction fetch stage circuit 106(0) for execution. The instruction memory 110 may be provided in or as part of a system memory in the processor-based device 100, as a non-limiting example. An instruction cache (captioned as "INSTR CACHE" in FIG. 1) 112 may also be provided in the processor device 102 to cache the instructions 108 fetched from the instruction memory 110 to reduce latency in the instruction fetch stage circuit 106(0).

The instruction fetch stage circuit 106(0) in the example of FIG. 1 is configured to provide the instructions 108 as fetched instructions 108F into the one or more instruction pipelines $I_0$-$I_N$ in the instruction processing circuit 104 to be pre-processed, before the fetched instructions 108F reach the execution stage circuit 106(4) to be executed. The fetched instructions 108F may include producer instructions and corresponding consumer instructions that consume data produced as a result of the instruction processing circuit 104 executing the producer instructions. The instruction pipelines $I_0$-$I_N$ are provided across the pipeline stage circuits 106 of the instruction processing circuit 104 to pre-process and process the fetched instructions 108F in a series of steps that can be performed concurrently to increase throughput prior to execution of the fetched instructions 108F by the execution stage circuit 106(4).

With continuing reference to FIG. 1, the decode stage circuit 106(1) is configured to decode each of the fetched instructions 108F fetched by the instruction fetch stage circuit 106(0) into corresponding decoded instructions 108D to determine, e.g., opcodes, operands, addressing modes, instruction types, and/or actions required, as non-limiting examples. Data such as the instruction type and action required encoded in the decoded instructions 108D may also be used to determine into which instruction pipeline $I_0$-$I_N$ the decoded instructions 108D should be placed. In this example, the decoded instructions 108D are placed into one or more of the instruction pipelines $I_0$-$I_N$ and are next provided to the rename stage circuit 106(2) in the instruction processing circuit 104. The rename stage circuit 106(2) is configured to determine if any register names in the decoded instructions 108D should be renamed to decouple any register dependencies that would prevent parallel or out-of-order processing.

The decoded instructions 108D are then provided to the scheduling stage circuit 106(3). The scheduling stage circuit 106(3) is configured to store each of the decoded instructions 108D in reservation entries (not shown) of RS circuits 114(0)-114(R) until all register operands for the decoded instruction 108D are ready and a suitable execution unit is available. In the example of FIG. 1, the RS circuit 114(0) stores instructions (captioned as "INST" in FIG. 1) 116(0)-116(N) of the decoded instructions 108D, while the RS circuit 114(R) stores instructions (captioned as "INST" in FIG. 1) 118(0)-118(M) of the decoded instructions 108D.

The scheduling stage circuit 106(3) is responsible for determining whether the necessary values for operands of each of the instructions 116(0)-116(N), 118(0)-118(M) are available before issuing the instructions 116(0)-116(N), 118(0)-118(M) for execution. When the operands are available, the scheduling stage circuit 106(3) is configured to issue a wake-up signal (not shown) to indicate that each of the instructions 116(0)-116(N), 118(0)-118(M) is now eligible for issuance in the RS circuits 114(0)-114(R) in response to issuance of a producer instruction to the execution stage circuit 106(4). The wake-up signal indicates that a produced value from execution of the issued producer instruction will be available, and thus the consumer instruction of the producer instruction is eligible for issuance to the execution stage circuit 106(4) behind the producer instruction.

The instructions 108 are next passed to the execution stage circuit 106(4) for execution. The execution stage circuit 106(4) according to some aspects may comprise additional elements and/or execution units (not shown), each of which may be configured to execute instructions issued by a corresponding RS circuit such as the RS circuits 114(0)-114(R) of the scheduling stage circuit 106(3). For example, the execution stage circuit 106(4) may comprise a load-store unit (LSU) circuit that is configured to handle execution of load instructions and store instructions, including generating corresponding virtual addresses and loading data from or storing data to memory.

After the instructions 108 are executed, the writeback stage circuit 106(5) writes results of instruction execution to memory (such e.g., cache or system memory, as non-limiting examples) or a register. Finally, the commit stage circuit 106(6) updates the architectural state of the processor device 102 to reflect the results of instruction execution. It is to be understood that the instruction processing circuit 104 in some aspects may include more, fewer, or different pipeline stage circuits 106 than illustrated in FIG. 1.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 and/or the processor device 102 may include elements in addition to or instead of those illustrated in FIG. 1, and/or may include more or fewer of the elements illustrated in FIG. 1. For example, the processor-based device 100 may further include caches, controllers, communications buses, and/or persistent storage devices, which are omitted from FIG. 1 for the sake of clarity.

As noted above, one conventional technique for power management involves limiting the rate at which a processor device such as the processor device 102 is allowed to issue instructions such as the instructions 116(0)-116(N), 118(0)-118(M) for execution during a specified time interval. In this regard, the processor device 102 in the example of FIG. 1 includes a power management circuit 120 that is configured to determine a throttle rate 122 to control instruction issue by the RS circuits 114(0)-114(R). It is to be understood that, while the power management circuit 120 is illustrated in FIG. 1 as an element of the processor device 102, some aspects may provide that the power management circuit 120 is implemented as an element external to the processor device 102.

To prevent issues such as deadlock situations and/or excessive delays that may result from conventional approaches, the processor device 102 provides credit logic circuits (captioned as "CREDIT LOG CIR" in FIG. 1) 124(0)-124(R) that each correspond to one of the RS circuits 114(0)-114(R). Using the credit logic circuit 124(0) as an example, in exemplary operation, the credit logic circuit 124(0) in some aspects receives the throttle rate 122 from the power management circuit 120. The credit logic circuit 124(0) sets a value of a credit counter (captioned as "CREDIT CTR" in FIG. 1) 126 of the credit logic circuit 124(0) to a replenishment amount (captioned as "REPL AMT" in FIG. 1) 128 that corresponds to the throttle rate 122. For example, the throttle rate 122 in some aspects may indicate a percentage of processor cycles of a time interval during which instructions may issue, while the replenishment amount 128 may be calculated as a product of the percentage and a count of the processor cycles of the time interval. Thus, if the time interval covers 16 processor cycles and the throttle rate 122 is 25%, the replenishment amount 128 may be calculated as 25%×16, or four (4).

The credit logic circuit 124(0) in FIG. 1 subsequently receives an instruction issue indication (captioned as "ISS IND" in FIG. 1) 130 for an instruction such as the instruction 116(0) from the RS circuit 114(0) during a first time interval (not shown). The instruction issue indication 130 communicates to the credit logic circuit 124(0) that the RS circuit 114(0) has issued the instruction 116(0). The credit logic circuit 124(0) decrements a value of the credit counter 126, and determines whether the value of the credit counter 126 equals or is less than a blocking threshold (captioned as "BLK" in FIG. 1) 132. The blocking threshold 132 according to some aspects may comprise a value of zero (0). In some aspects, a communications latency of one or more processor cycles may exist between the credit logic circuit 124(0) and the RS circuit 114(0) due to, e.g., the physical placement of the credit logic circuit 124(0) relative to the RS circuit 114(0). In such aspects, the blocking threshold 132 may comprise a count of processor cycles of the communications latency. This ensures that the credit logic circuit 124(0) is able to block issuance of instructions by the RS circuit 114(0) in a timely fashion, if necessary.

If the credit logic circuit 124(0) determines that the value of the credit counter 126 equals or is less than the blocking threshold 132, the credit logic circuit 124(0) asserts a block signal (captioned as "BLK SIG" in FIG. 1) 134 to the RS circuit 114(0). The RS circuit 114(0) receives the block signal 134, and, responsive to receiving the block signal 134, blocks further instruction issuance during the time interval. If the value of the credit counter 126 is greater than the blocking threshold 132, the block signal 134 remains unasserted, and the RS circuit 114(0) can continue to issue the instructions 116(1)-116(N) and transmit corresponding instruction issue indications (not shown) to the credit logic circuit 124(0).

According to some aspects, at a start of a next time interval, the credit logic circuit 124(0) deasserts the block signal 134 to the RS circuit 114(0) and resets the credit counter 126 to the replenishment amount 128. Some aspects may provide that, at the start of the next time interval, the credit logic circuit 124(0) deasserts the block signal 134 to the RS circuit 114(0) and adds the replenishment amount 128 to the value of the credit counter 126, thereby allowing unused credits to accumulate over multiple time intervals. In some such aspects, the credit logic circuit 124(0) may determine whether the value of the credit counter 126 exceeds a maximum threshold (captioned as "MAX" in FIG. 1) 136. If so, the credit logic circuit 124(0) sets the value of the credit counter 126 to the maximum threshold 136.

It is to be understood that, while not shown in FIG. 1 for the sake of clarity, the credit logic circuit 124(R) includes elements and functionality corresponding to the elements and functionality described above with respect to the credit logic circuit 124(0), and performs the corresponding functionality in conjunction with the RS circuit 114(R).

Figure 2:
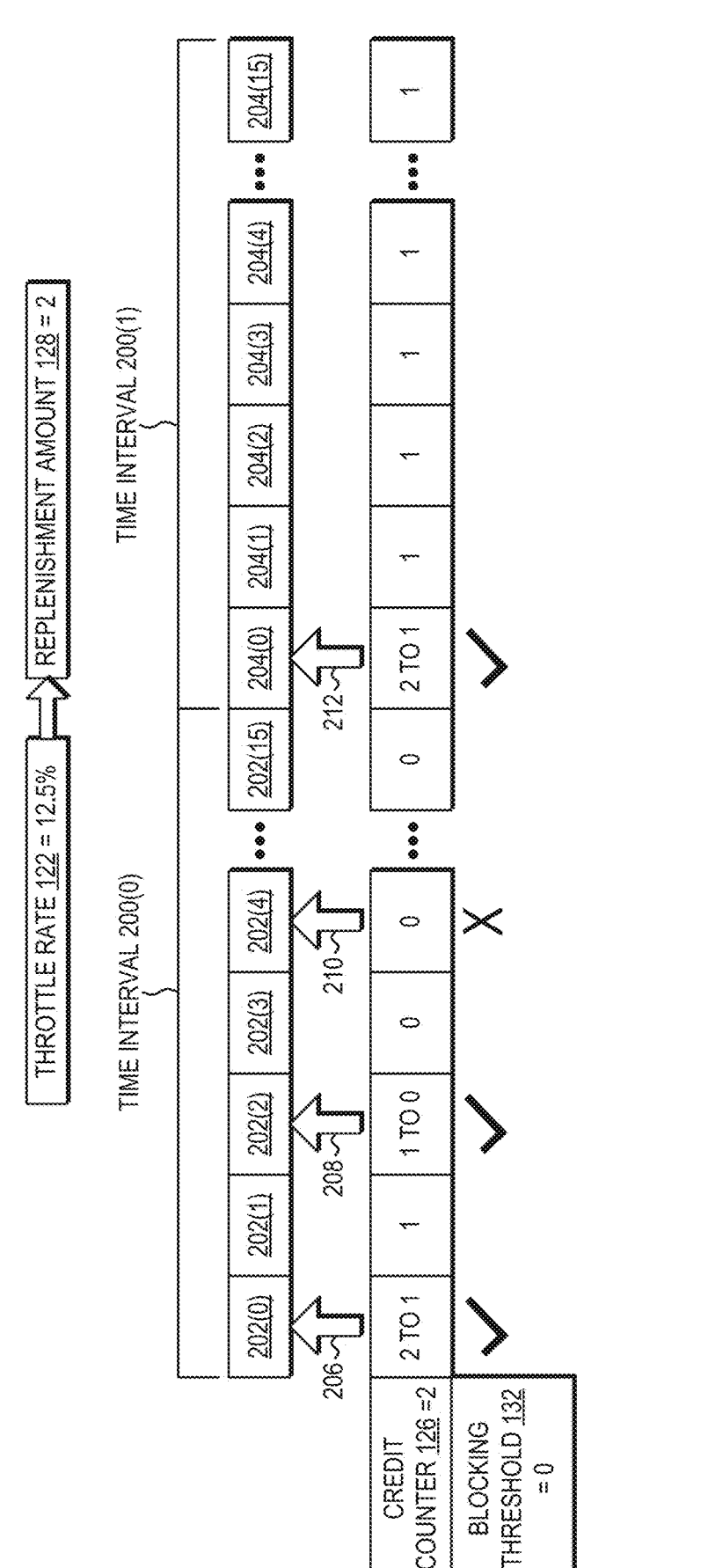
FIG. 2 is a block diagram illustrating in greater detail exemplary operations of the credit logic circuit of FIG. 1 for limiting instruction issue over two time intervals, according to some aspects.

To illustrate in greater detail exemplary operations of a credit logic circuit such as the credit logic circuit 124(0) and the RS circuit 114(0) of FIG. 1 for limiting instruction issue over multiple time intervals according to some aspects, FIG. 2 is provided. FIG. 2 shows the throttle rate 122, the replenishment amount 128, the credit counter 126, and the blocking threshold 132 of FIG. 1. In this example, the throttle rate 122 is specified as 12.5%, and applies to two (2) time intervals 200(0), 200(1) that each comprise 16 processor cycles 202(0)-202(15), 204(0)-204(15), respectively. Based on the throttle rate 122, the replenishment amount 128 is determined to have a value of two (2) (i.e., 12.5% of 16). Accordingly, the initial value of the credit counter 126 is set to two (2). The blocking threshold 132 in this example is zero (0).

During the processor cycle 202(0) of the time interval 200(0), the credit logic circuit 124(0) (not shown in FIG. 2) receives an instruction issue indication represented by arrow 206, indicating that an instruction has been issued by the RS circuit 114(0) (not shown in FIG. 2). The credit logic circuit 124(0) decrements the value of the credit counter 126 to a value of one (1), and compares the value of the credit counter 126 with the blocking threshold 132 (i.e., zero (0)). Because they are not equal, the block signal 134 (not shown in FIG. 2) remains deasserted, and processing continues.

Two (2) processor cycles later, during the processor cycle 202(2) of the time interval 200(0), the credit logic circuit 124(0) receives an instruction issue indication represented by arrow 208, indicating that another instruction has been issued by the RS circuit 114(0). The credit logic circuit 124(0) decrements the value of the credit counter 126 to a value of zero (0), and compares the value of the credit counter 126 with the blocking threshold 132 (i.e., zero (0)). Upon determining that they are equal, the credit logic circuit 124(0) asserts the block signal 134, and processing continues.

In processor cycle 202(4) of the time interval 200(0), the RS circuit 114(0) determines that an instruction is ready for issue, as represented by arrow 210. However, the RS circuit 114(0) determines that the block signal 134 is asserted, and consequently the RS circuit 114(0) blocks instruction issuance for the remainder of the time interval 200(0).

Finally, when the time interval 200(1) begins, the credit logic circuit 124(0) deasserts the block signal 134, and adds the replenishment amount 128 to the credit counter 126 during the processor cycle 204(0), bringing the value of the credit counter 126 back to two (2). The credit logic circuit 124(0) also receives an instruction issue indication 130 (not shown in FIG. 2) represented by arrow 212, indicating that an instruction (e.g., the same instruction that was blocked during the processor cycle 202(4)) has been issued by the RS circuit 114(0). In this case, the credit logic circuit 124(0) decrements the value of the credit counter 126 to a value of one (1), and compares the value of the credit counter 126 with the blocking threshold 132 (i.e., zero (0)). Because they are not equal, the blocking signal remains deasserted, and processing continues.

Figure 3A:
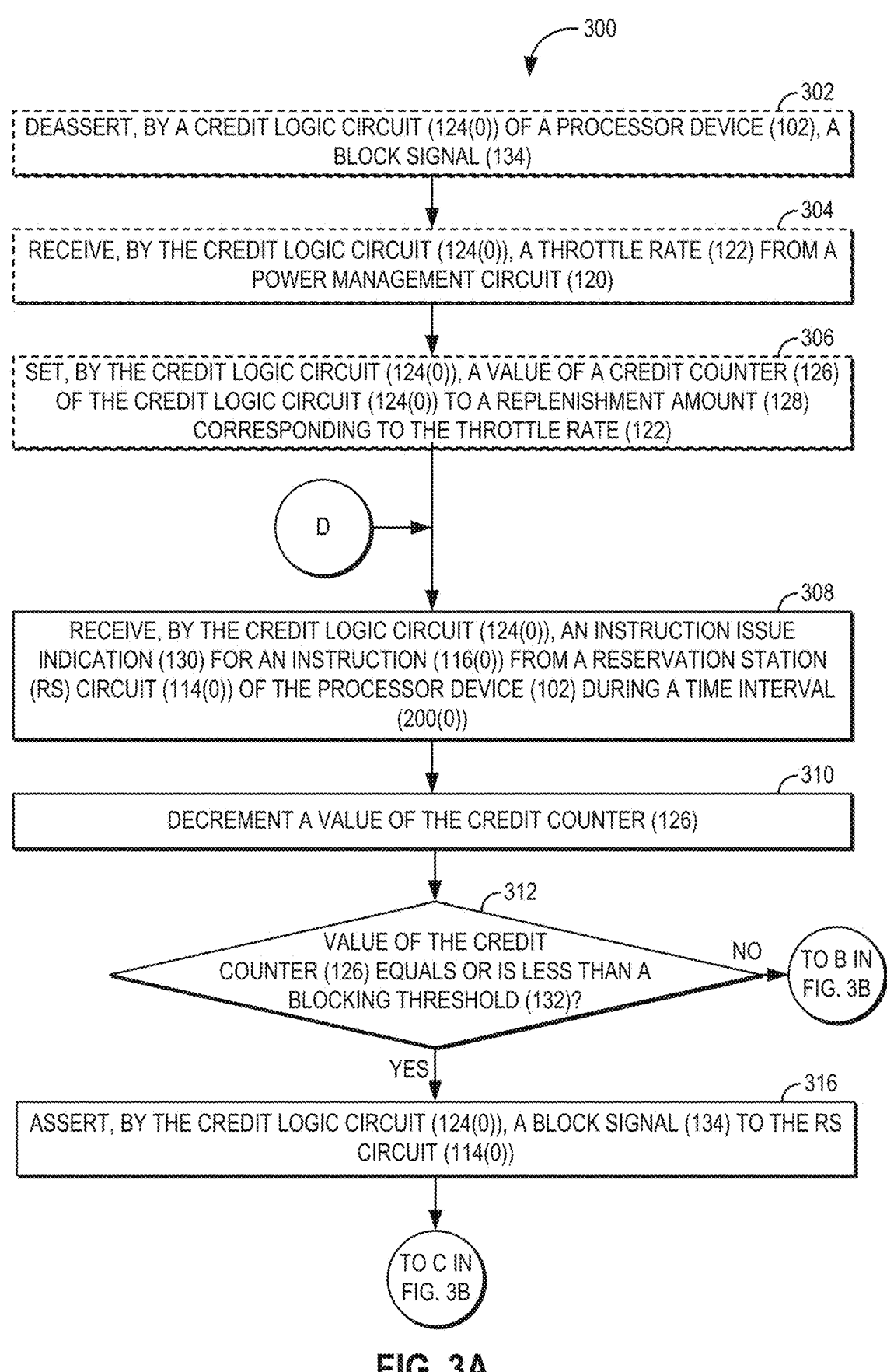
FIGS. 3A-3B provide a flowchart illustrating exemplary operations performed by the credit logic circuit of FIG. 1 for controlling instruction issue rate using credit-based mechanisms, according to some aspects.
Figure 3B:
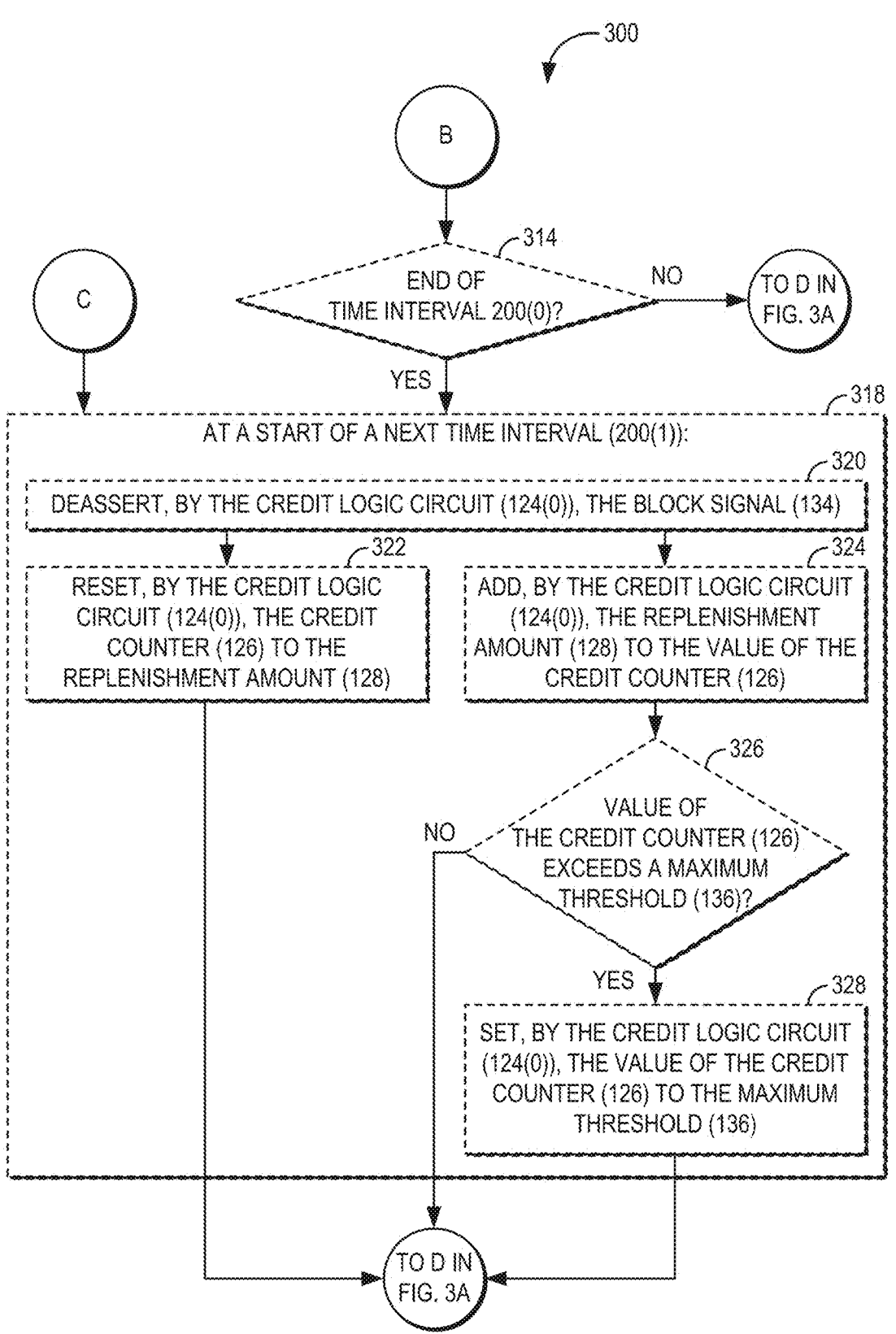

To illustrate exemplary operations of the credit logic circuit 124(0) of FIG. 1 for controlling instruction issue rate using credit-based mechanisms according to some aspects, FIGS. 3A-3B provide a flowchart showing exemplary operations 300. Elements of FIGS. 1 and 2 are referenced in describing FIGS. 3A-3B for the sake of clarity. It is to be understood that some of the exemplary operations 300 shown in FIGS. 3A-3B may be performed in an order other than that illustrated herein in some aspects, and/or may be omitted in some aspects.

As seen in FIG. 3A, the exemplary operations 300 in some aspects begin with a credit logic circuit (e.g., the credit logic circuit 124(0) of FIG. 1) of a processor device (such as the processor device 102 of FIG. 1) deasserting a block signal (e.g., the block signal 134 of FIG. 1) (block 302). The credit logic circuit 124(0) in such aspects receives a throttle rate (e.g., the throttle rate 122 of FIG. 1) from a power management circuit (such as the power management circuit 120 of FIG. 1) (block 304). The credit logic circuit 124(0) then sets a value of a credit counter (e.g., the credit counter 126 of FIG. 1) of the credit logic circuit 124(0) to a replenishment amount (such as the replenishment amount 128 of FIG. 1) corresponding to the throttle rate 122 (block 306).

The credit logic circuit 124(0) subsequently receives an instruction issue indication (e.g., the instruction issue indication 130 of FIG. 1) for an instruction (such as the instruction 116(0) of FIG. 1) from an RS circuit (e.g., the RS circuit 114(0) of FIG. 1) of the processor device 102 during a time interval (such as the time interval 200(0) of FIG. 2) (block 308). The credit logic circuit 124(0) decrements a value of the credit counter 126 (block 310). The credit logic circuit 124(0) determines whether a value of the credit counter 126 equals or is less than a blocking threshold (e.g., the blocking threshold 132 of FIG. 1) (block 312). If not, the exemplary operations 300 in some aspects may continue at block 314 of FIG. 3B. However, if the credit logic circuit 124(0) determines at decision block 312 that the value of the credit counter 126 equals or is less than the blocking threshold 132, the credit logic circuit 124(0) asserts a block signal (e.g., block signal 134 of FIG. 1) to the RS circuit 114(0) (block 316). The exemplary operations 300 in some aspects may then continue at block 318 of FIG. 3B.

Referring now to FIG. 3B, the credit logic circuit 124(0) according to some aspects may determine whether the end of the time interval 200(0) has been reached (block 314). If not, the exemplary operations 300 may continue at block 308 of FIG. 3A (i.e., after issuance of another instruction of the instructions 116(0)-116(N) of FIG. 1 by the RS circuit 114(0) of FIG. 1). If the credit logic circuit 124(0) determines at decision block 314 that the end of the time interval 200(0) has been reached, the credit logic circuit 124(0) may perform a series of operations at a start of a next time interval (e.g., the time interval 200(1) of FIG. 2) (block 318). The credit logic circuit 124(0) deasserts the block signal 134 (block 320). In some aspects, at the start of the next time interval 200(1), the credit logic circuit 124(0) resets the credit counter 126 to the replenishment amount 128 (block 322). Some aspects may provide that, at the start of the next time interval 200(1), the credit logic circuit 124(0) adds the replenishment amount 128 to the value of the credit counter 126 (block 324). In some such aspects, the credit logic circuit 124(0) then determines whether the value of the credit counter 126 exceeds a maximum threshold (such as the maximum threshold 136 of FIG. 1) (block 326). If not, the exemplary operations 300 may continue at block 308 of FIG. 3A for the next time interval 200(1). If the credit logic circuit 124(0) determines at decision block 326 that the value of the credit counter 126 does exceed the maximum threshold 136, the credit logic circuit 124(0) sets the value of the credit counter 126 to the maximum threshold 136 (block 328). The exemplary operations 300 then continue at block 308 of FIG. 3A for the next time interval 200(1).

Figure 4:
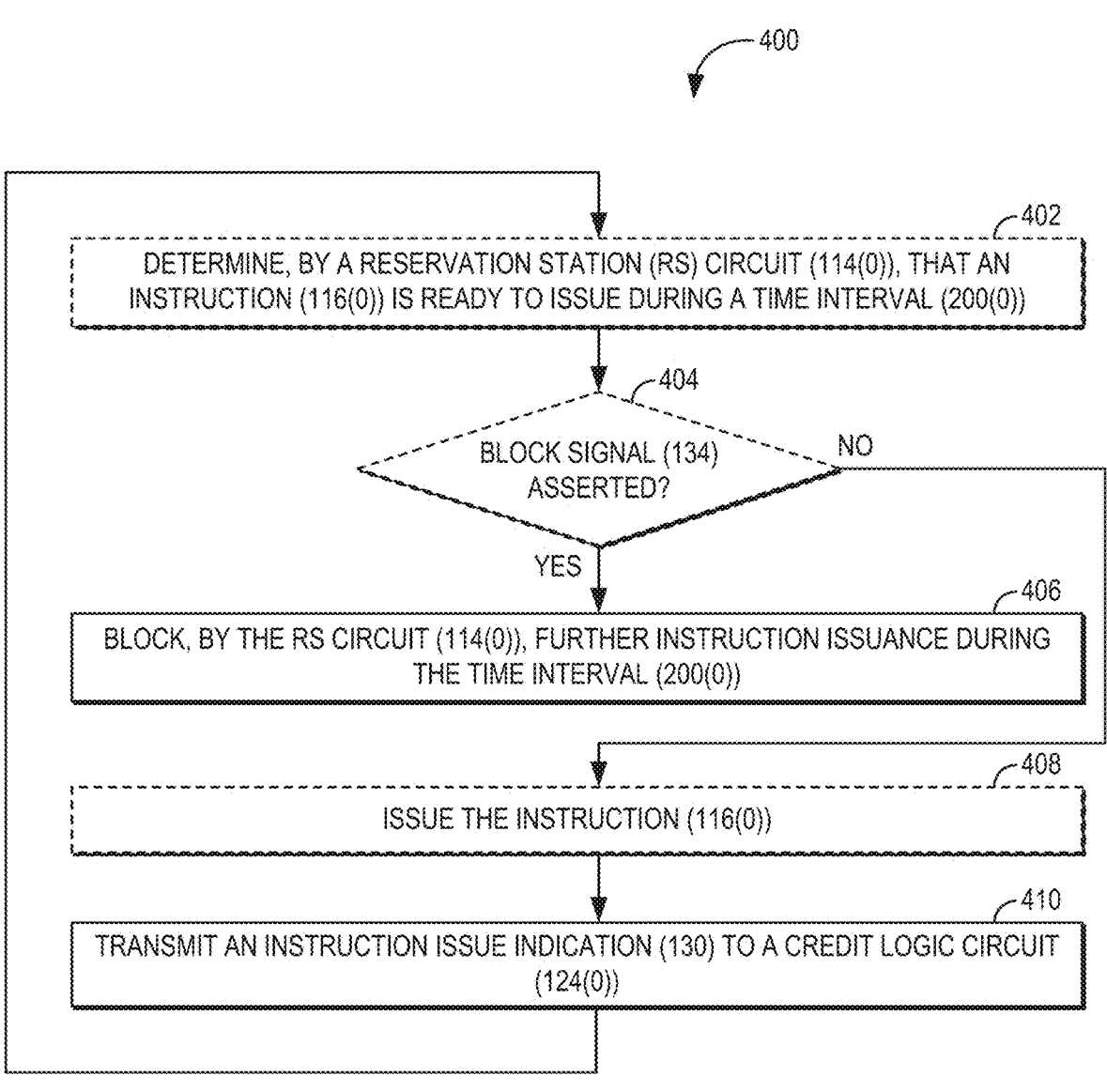
FIG. 4 provides a flowchart illustrating exemplary operations performed by the reservation station (RS) circuit of FIG. 1 for performing or blocking instruction issuance based on the block signal of FIG. 1, according to some aspects.

FIG. 4 provides a flowchart illustrating exemplary operations 400 that may be performed by RS circuits such as the RS circuit 114(0) of FIG. 1 for performing or blocking instruction issuance based on the block signal 134 of FIG. 1, according to some aspects. For the sake of clarity, elements of FIGS. 1 and 2 are referenced in describing FIG. 4. It is to be understood that some of the exemplary operations 400 shown in FIG. 4 may be performed in an order other than that illustrated herein in some aspects, and/or may be omitted in some aspects.

Operations in FIG. 4 begin with an RS circuit (e.g., the RS circuit 114(0) of FIG. 1) determining that an instruction (such as the instruction 116(0) of FIG. 1) is ready to issue during a time interval (e.g., the time interval 200(0) of FIG. 2) (block 402). The RS circuit 114(0) determines whether a block signal (such as the block signal 134 of FIG. 1) is asserted (block 404). If so, the RS circuit 114(0) blocks further instruction issuance during the time interval 200(0) (block 406). However, if the RS circuit 114(0) determines at decision block 404 that the block signal 134 is not asserted, the RS circuit 114(0) issues the instruction 116(0) (block 408). The RS circuit 114(0) then transmits an instruction issue indication (such as the instruction issue indication 130 of FIG. 1) to a credit logic circuit (e.g., the credit logic circuit 124(0) of FIG. 1) (block 410). The exemplary operations 400 then continue at block 402.

The processor device according to aspects disclosed herein and discussed with reference to FIGS. 1 and 2 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 5:
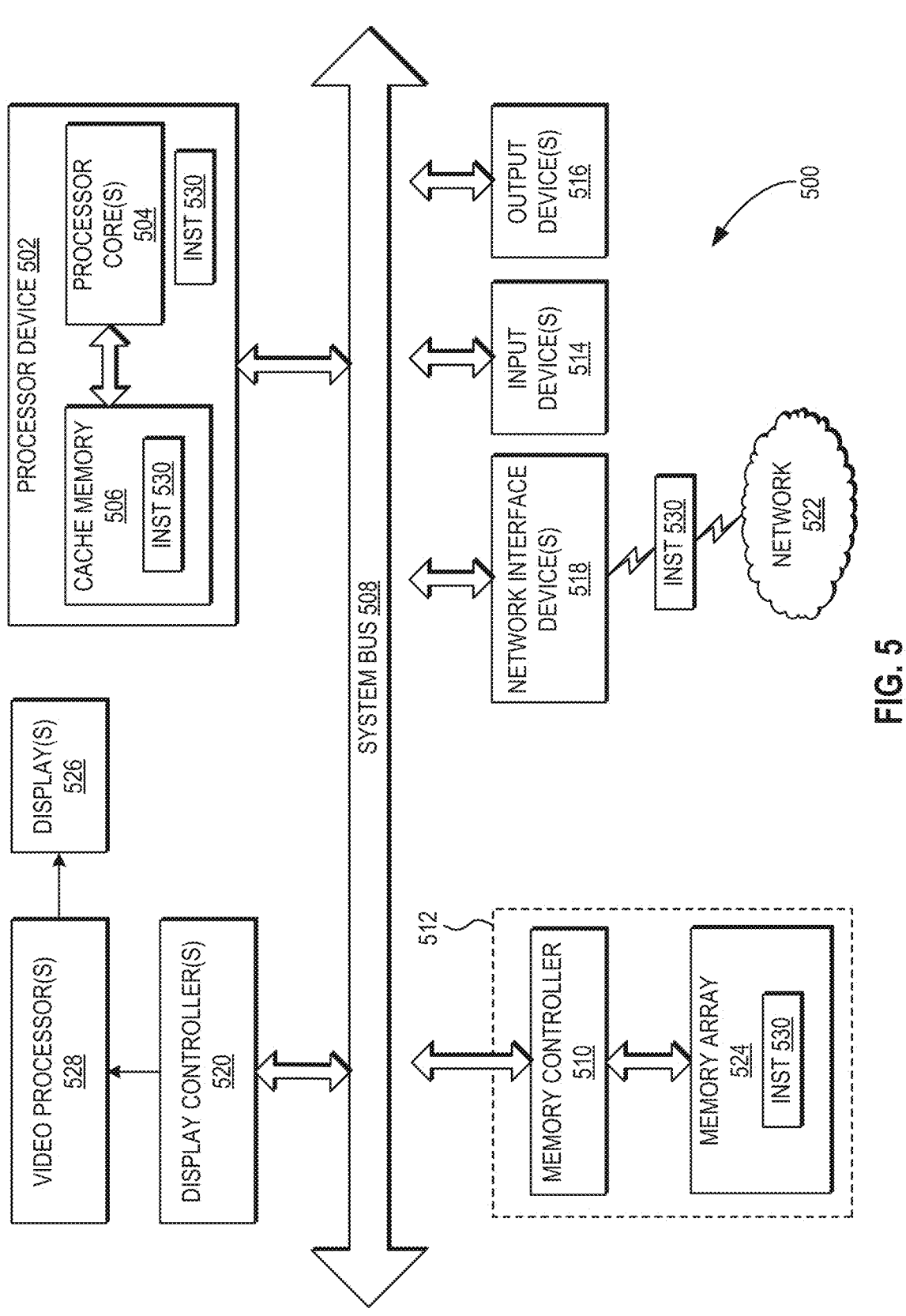
FIG. 5 is a block diagram of an exemplary processor-based device that can include the processor device of FIG. 1.

In this regard, FIG. 5 illustrates an example of a processor-based device 500. In this example, the processor-based device 500 includes a processor device 502, which corresponds in functionality to the processor device 102 of FIG. 1 and comprises one or more processor cores 504 coupled to a cache memory 506. The processor device 502 is also coupled to a system bus 508 and can intercouple devices included in the processor-based device 500. As is well known, the processor device 502 communicates with these other devices by exchanging address, control, and data information over the system bus 508. For example, the processor device 502 can communicate bus transaction requests to a memory controller 510. Although not illustrated in FIG. 5, multiple system buses 508 could be provided, wherein each system bus 508 constitutes a different fabric.

Other devices may be connected to the system bus 508. As illustrated in FIG. 5, these devices can include a memory system 512, one or more input devices 514, one or more output devices 516, one or more network interface devices 518, and one or more display controllers 520, as examples. The input device(s) 514 can include any type of input device, including, but not limited to, input keys, switches, voice processors, etc. The output device(s) 516 can include any type of output device, including, but not limited to, audio, video, other visual indicators, etc. The network interface device(s) 518 can be any devices configured to allow exchange of data to and from a network 522. The network 522 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 518 can be configured to support any type of communications protocol desired. The memory system 512 can include the memory controller 510 coupled to one or more memory arrays 524.

The processor device 502 may also be configured to access the display controller(s) 520 over the system bus 508 to control information sent to one or more displays 526. The display controller(s) 520 sends information to the display(s) 526 to be displayed via one or more video processors 528, which process the information to be displayed into a format suitable for the display(s) 526. The display(s) 526 can include any type of display, including, but not limited to, a cathode ray tube (CRT), a liquid crystal display (LCD), a plasma display, a light emitting diode (LED) display, etc.

The processor-based device 500 in FIG. 5 may include a set of instructions (captioned as "INST" in FIG. 5) 530 that may be executed by the processor device 502 for any application desired according to the instructions. The instructions 530 may be stored in the memory system 512, the processor device 502, and/or the cache memory 506, each of which may comprise an example of a non-transitory computer-readable medium. The instructions 530 may also reside, completely or at least partially, within the memory system 512 and/or within the processor device 502 during their execution. The instructions 530 may further be transmitted or received over the network 522, such that the network 522 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 530. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
    an instruction processing circuit comprising a plurality of pipeline stage circuits including a scheduling stage circuit comprising a reservation station (RS) circuit;
    a credit logic circuit communicatively coupled to the RS circuit and comprising a credit counter;
    the credit logic circuit configured to:
        receive an instruction issue indication for an instruction from the RS circuit during a time interval;
        decrement a value of the credit counter;
        determine whether the value of the credit counter equals or is less than a blocking threshold; and
        responsive to determining that the value of the credit counter equals or is less than the blocking threshold, assert a block signal to the RS circuit; and
    the RS circuit configured to:
        receive the block signal; and
        responsive to receiving the block signal, block further instruction issuance during the time interval.

2. The processor device of clause 1, wherein the RS circuit is further configured to:
    determine whether the block signal is asserted; and
    responsive to determining that the block signal is not asserted:
        issue the instruction; and
        transmit the instruction issue indication to the credit logic circuit.

3. The processor device of any one of clauses 1-2, wherein:
    the credit logic circuit is further configured to:
        deassert the block signal to the RS circuit;
        receive a throttle rate from a power management circuit; and
        set the value of the credit counter to a replenishment amount corresponding to the throttle rate;
    the throttle rate indicates a percentage of processor cycles of the time interval during which instructions may issue; and
    the replenishment amount comprises a product of the percentage and a count of the processor cycles of the time interval.

4. The processor device of any one of clauses 1-3, wherein the blocking threshold comprises a value of zero (0).

5. The processor device of any one of clauses 1-3, wherein the blocking threshold comprises a count of processor cycles of communications latency between the credit logic circuit and the RS circuit.

6. The processor device of clause 3, wherein the credit logic circuit is further configured to, at a start of a next time interval:
    deassert the block signal to the RS circuit; and
    reset the credit counter to the replenishment amount.

7. The processor device of clause 3, wherein the credit logic circuit is further configured to, at a start of a next time interval:
    deassert the block signal to the RS circuit; and
    add the replenishment amount to the value of the credit counter.

8. The processor device of clause 7, wherein the credit logic circuit is further configured to:
    determine whether the value of the credit counter exceeds a maximum threshold; and
    responsive to determining that the value of the credit counter exceeds the maximum threshold, set the value of the credit counter to the maximum threshold.

9. The processor device of any one of clauses 1-8, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A processor device, comprising:
    means for receiving an instruction issue indication for an instruction from a reservation station (RS) circuit during a time interval;
    means for decrementing a value of a credit counter;
    means for determining whether the value of the credit counter equals or is less than a blocking threshold;
    means for asserting a block signal to the RS circuit, responsive to determining that the value of the credit counter equals or is less than the blocking threshold;
    means for receiving the block signal; and
    means for blocking further instruction issuance during the time interval, responsive to receiving the block signal.

11. A method for controlling instruction issue rate using credit-based mechanisms in processor devices, comprising:
    receiving, by a credit logic circuit of a processor device, an instruction issue indication for an instruction from a reservation station (RS) circuit of the processor device during a time interval;
    decrementing, by the credit logic circuit, a value of a credit counter;
    determining, by the credit logic circuit, that the value of the credit counter equals or is less than a blocking threshold;
    responsive to determining that the value of the credit counter equals or is less than the blocking threshold, asserting, by the credit logic circuit, a block signal to the RS circuit;
    receiving, by the RS circuit, the block signal; and
    responsive to receiving the block signal, blocking, by the RS circuit, further instruction issuance during the time interval.

12. The method of clause 11, further comprising:

determining, by the RS circuit, that the block signal is not asserted; and responsive to determining that the block signal is not asserted:

issuing the instruction; and transmitting the instruction issue indication to the credit logic circuit.

13. The method of any one of clauses 11-12, further comprising:

deasserting, by the credit logic circuit, the block signal to the RS circuit;

receiving, by the credit logic circuit, a throttle rate from a power management circuit; and setting, by the credit logic circuit, the value of the credit counter of the credit logic circuit to a replenishment amount corresponding to the throttle rate;

wherein:

the throttle rate indicates a percentage of processor cycles of the time interval during which instructions may issue; and the replenishment amount comprises a product of the percentage and a count of the processor cycles of the time interval.

14. The method of any one of clauses 11-13, wherein the blocking threshold comprises a value of zero (0).

15. The method of any one of clauses 11-13, wherein the blocking threshold comprises a count of processor cycles of communications latency between the credit logic circuit and the RS circuit.

16. The method of clause 13, further comprising, at a start of a next time interval:

deasserting, by the credit logic circuit, the block signal to the RS circuit; and resetting, by the credit logic circuit, the credit counter to the replenishment amount.

17. The method of clause 13, further comprising, at a start of a next time interval:

deasserting, by the credit logic circuit, the block signal to the RS circuit; and adding, by the credit logic circuit, the replenishment amount to the value of the credit counter.

18. The method of clause 17, further comprising:

determining, by the credit logic circuit, that the value of the credit counter exceeds a maximum threshold; and responsive to determining that the value of the credit counter exceeds the maximum threshold, setting, by the credit logic circuit, the value of the credit counter to the maximum threshold.

19. A non-transitory computer-readable medium, having stored thereon computer-executable instructions that, when executed by a processor device, cause the processor device to:

receive an instruction issue indication for an instruction from a reservation station (RS) circuit during a time interval;

decrement a value of a credit counter;

determine whether the value of the credit counter equals or is less than a blocking threshold;

responsive to determining that the value of the credit counter equals or is less than the blocking threshold, assert a block signal to the RS circuit;

receive the block signal; and responsive to receiving the block signal, block further instruction issuance during the time interval.

20. The non-transitory computer-readable medium of clause 19, wherein the computer-executable instructions further cause the processor device to:

determine whether the block signal is asserted; and responsive to determining that the block signal is not asserted:

issue the instruction; and transmit the instruction issue indication.

What is claimed is:

1. A processor device, comprising:

an instruction processing circuit comprising a plurality of pipeline stage circuits including a scheduling stage circuit comprising a reservation station (RS) circuit;

a credit logic circuit communicatively coupled to the RS circuit and comprising a credit counter;

the credit logic circuit configured to:

receive an instruction issue indication for an instruction from the RS circuit during a static time interval;

decrement a value of the credit counter;

determine whether the value of the credit counter equals or is less than a blocking threshold; and responsive to determining that the value of the credit counter equals or is less than the blocking threshold, assert a block signal to the RS circuit; and the RS circuit configured to:

receive the block signal; and responsive to receiving the block signal, block further instruction issuance during the static time interval.

2. The processor device of claim 1, wherein the RS circuit is further configured to:

determine whether the block signal is asserted; and responsive to determining that the block signal is not asserted:

issue the instruction; and transmit the instruction issue indication to the credit logic circuit.

3. The processor device of claim 1, wherein:

the credit logic circuit is further configured to:

deassert the block signal to the RS circuit;

receive a throttle rate from a power management circuit; and set the value of the credit counter to a replenishment amount corresponding to the throttle rate;

the throttle rate indicates a percentage of processor cycles of the static time interval during which instructions may issue; and the replenishment amount comprises a product of the percentage and a count of the processor cycles of the static time interval.

4. The processor device of claim 1, wherein the blocking threshold comprises a value of zero (0).

5. The processor device of claim 1, wherein the blocking threshold comprises a count of processor cycles of communications latency between the credit logic circuit and the RS circuit.

6. The processor device of claim 3, wherein the credit logic circuit is further configured to, at a start of a next static time interval:

deassert the block signal to the RS circuit; and reset the credit counter to the replenishment amount.

7. The processor device of claim 3, wherein the credit logic circuit is further configured to, at a start of a next static time interval:

deassert the block signal to the RS circuit; and add the replenishment amount to the value of the credit counter.

8. The processor device of claim 7, wherein the credit logic circuit is further configured to:

determine whether the value of the credit counter exceeds a maximum threshold; and responsive to determining that the value of the credit counter exceeds the maximum threshold, set the value of the credit counter to the maximum threshold.

9. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A processor device, comprising:

means for receiving an instruction issue indication for an instruction from a reservation station (RS) circuit during a static time interval;

means for decrementing a value of a credit counter;

means for determining whether the value of the credit counter equals or is less than a blocking threshold;

means for asserting a block signal to the RS circuit, responsive to determining that the value of the credit counter equals or is less than the blocking threshold;

means for receiving the block signal; and means for blocking further instruction issuance during the static time interval, responsive to receiving the block signal.

11. A method for controlling instruction issue rate using credit-based mechanisms in processor devices, comprising:

receiving, by a credit logic circuit of a processor device, an instruction issue indication for an instruction from a reservation station (RS) circuit of the processor device during a static time interval;

decrementing, by the credit logic circuit, a value of a credit counter;

determining, by the credit logic circuit, that the value of the credit counter equals or is less than a blocking threshold;

responsive to determining that the value of the credit counter equals or is less than the blocking threshold, asserting, by the credit logic circuit, a block signal to the RS circuit;

receiving, by the RS circuit, the block signal; and responsive to receiving the block signal, blocking, by the RS circuit, further instruction issuance during the static time interval.

12. The method of claim 11, further comprising:

determining, by the RS circuit, that the block signal is not asserted; and responsive to determining that the block signal is not asserted:

issuing the instruction; and transmitting the instruction issue indication to the credit logic circuit.

13. The method of claim 11, further comprising:

deasserting, by the credit logic circuit, the block signal to the RS circuit;

receiving, by the credit logic circuit, a throttle rate from a power management circuit; and setting, by the credit logic circuit, the value of the credit counter of the credit logic circuit to a replenishment amount corresponding to the throttle rate;

wherein:

the throttle rate indicates a percentage of processor cycles of the static time interval during which instructions may issue; and the replenishment amount comprises a product of the percentage and a count of the processor cycles of the static time interval.

14. The method of claim 11, wherein the blocking threshold comprises a value of zero (0).

15. The method of claim 11, wherein the blocking threshold comprises a count of processor cycles of communications latency between the credit logic circuit and the RS circuit.

16. The method of claim 13, further comprising, at a start of a next static time interval:

deasserting, by the credit logic circuit, the block signal to the RS circuit; and resetting, by the credit logic circuit, the credit counter to the replenishment amount.

17. The method of claim 13, further comprising, at a start of a next static time interval:

deasserting, by the credit logic circuit, the block signal to the RS circuit; and adding, by the credit logic circuit, the replenishment amount to the value of the credit counter.

18. The method of claim 17, further comprising:

determining, by the credit logic circuit, that the value of the credit counter exceeds a maximum threshold; and responsive to determining that the value of the credit counter exceeds the maximum threshold, setting, by the credit logic circuit, the value of the credit counter to the maximum threshold.

19. A non-transitory computer-readable medium, having stored thereon computer-executable instructions that, when executed by a processor device, cause the processor device to:

receive an instruction issue indication for an instruction from a reservation station (RS) circuit during a static time interval;

decrement a value of a credit counter;

determine whether the value of the credit counter equals or is less than a blocking threshold;

responsive to determining that the value of the credit counter equals or is less than the blocking threshold, assert a block signal to the RS circuit;

receive the block signal; and responsive to receiving the block signal, block further instruction issuance during the static time interval.

20. The non-transitory computer-readable medium of claim 19, wherein the computer-executable instructions further cause the processor device to:

determine whether the block signal is asserted; and responsive to determining that the block signal is not asserted:

issue the instruction; and transmit the instruction issue indication.

* * * * *